United States Patent
Douglas et al.

(10) Patent No.: US 8,868,269 B2
(45) Date of Patent: Oct. 21, 2014

(54) SYSTEM AND METHOD FOR INCREASING OPERATING EFFICIENCY OF A HYBRID VEHICLE

(75) Inventors: Scot A. Douglas, Howell, MI (US); Craig D. Marriott, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 405 days.

(21) Appl. No.: 13/207,923

(22) Filed: Aug. 11, 2011

(65) Prior Publication Data
US 2013/0041532 A1    Feb. 14, 2013

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*F02D 13/02* (2006.01)
*F01L 1/26* (2006.01)
*B60W 30/18* (2012.01)
*F02D 41/12* (2006.01)
*F02D 41/00* (2006.01)
*F01L 1/047* (2006.01)
*B60W 20/00* (2006.01)
*F02D 41/02* (2006.01)
*B60W 10/06* (2006.01)
*F02N 11/04* (2006.01)

(52) U.S. Cl.
CPC ........ *F02D 41/123* (2013.01); *B60W 30/18072* (2013.01); *F02D 13/0257* (2013.01); *F02D 41/126* (2013.01); *F02D 2041/001* (2013.01); *F01L 2001/0473* (2013.01); *Y02T 10/42* (2013.01); *B60W 20/00* (2013.01); *F01L 1/047* (2013.01); *F02D 41/0005* (2013.01); *F02D 41/0235* (2013.01); *B60W 10/06* (2013.01); *F02N 11/04* (2013.01); *F01L 1/26* (2013.01); *Y02T 10/18* (2013.01); *Y10S 903/905* (2013.01)
USPC .......................... 701/22; 180/65.28; 903/905

(58) Field of Classification Search
None
See application file for complete search history.

(56) References Cited

U.S. PATENT DOCUMENTS

| 7,082,912 B2 * | 8/2006 | Folino ........................ 123/90.16 |
| 7,287,513 B2 * | 10/2007 | Morin ........................... 123/432 |
| 2009/0205889 A1 * | 8/2009 | Leone ...................... 180/65.265 |
| 2010/0038158 A1 * | 2/2010 | Whitney et al. .......... 180/65.265 |

* cited by examiner

*Primary Examiner* — Helal A Algahaim
*Assistant Examiner* — Kelly E Darby
(74) *Attorney, Agent, or Firm* — Quinn Law Group, PLLC

(57) ABSTRACT

A method is provided for controlling a hybrid electric vehicle that includes an internal combustion engine having a cylinder with first and second intake valves and a piston configured to rotate the engine's crankshaft. The method includes determining whether deceleration of the vehicle is desired and ceasing supply of fuel to the cylinder when such condition is satisfied. The method also includes closing the first intake valve at a first predetermined instance and closing the second intake valve at a second predetermined instance via a specifically configured device when the fuel supply has been ceased. The second predetermined instance is after the first predetermined instance relative to rotational position of the crankshaft and magnitude of compression pulses in the cylinder during deceleration is reduced relative to when the cylinder is being fueled. A system for controlling the hybrid vehicle and a vehicle employing such a system are also provided.

17 Claims, 3 Drawing Sheets

SYSTEM AND METHOD FOR INCREASING OPERATING EFFICIENCY OF A HYBRID VEHICLE

TECHNICAL FIELD

The present disclosure is drawn to a system and a method for increasing operating efficiency of a hybrid vehicle.

BACKGROUND

Among many uses for internal combustion engines, such engines are often employed for powering various vehicles, either as a primary power source, or as part of a hybrid powertrain. When an internal combustion engine is used in a hybrid powertrain, such an engine is combined with one or more electric motors to power the vehicle.

In order to maximize fuel efficiency of a hybrid vehicle, it is often desirable to shut the engine off and decouple it from the driven wheels when the vehicle is subject to deceleration. If, however, the powertrain is configured such that the engine may not be completely decoupled from the driven wheels, it is at least desirable to shut off the engine's supply of fuel, while permitting the engine to be motored or driven by the vehicle's inertia. When such a permanently coupled engine's fuel supply is shut off during vehicle deceleration, the engine continues to operate as an air pump which incurs spin and pumping losses and also increases engine braking. Generally, such losses reduce gains in fuel efficiency that may otherwise result from the engine being shut off. Additionally, such losses are likely to reduce the energy available to be recaptured by the powertrain's electric motor for recharging vehicle batteries.

SUMMARY

A method is provided for controlling a hybrid electric vehicle. The vehicle has an internal combustion engine that includes a crankshaft, a cylinder provided with a first intake valve, a second intake valve, and an exhaust valve, and a piston configured to reciprocate inside the cylinder and rotate the crankshaft. The vehicle additionally has a motor-generator and an energy-storage system operatively connected to the engine and to the motor-generator. The method includes determining whether a deceleration of the vehicle is desired and ceasing a supply of fuel to the cylinder when such condition is satisfied. The method also includes closing the first intake valve at a first predetermined instance via a device operatively connected to the cylinder when the supply of fuel to the cylinder has been ceased.

The method additionally includes closing the second intake valve via the device at a second predetermined instance when the supply of fuel to the cylinder has been ceased. According to the method, the second predetermined instance is after the first predetermined instance relative to rotational position of the crankshaft. As a result of closing the first and second intake valves at the respective instances, a magnitude of compression pulses in the cylinder during deceleration is reduced relative to when the cylinder is being fueled. Accordingly, pumping and spin losses in the engine during deceleration are also reduced.

The exhaust valve may be in fluid communication with an exhaust system that includes a three-way catalyst. Accordingly, the act of closing the second intake valve at the second predetermined instance may force a predetermined amount of intake air into the three-way catalyst via the exhaust system. Additionally, the predetermined amount of intake air thus forced into the three-way catalyst may be reduced as compared to an amount of intake air that would be forced into the three-way catalyst if the second intake valve was closed at the first predetermined instance.

The method may also include resuming supply of fuel to the cylinder when acceleration of the vehicle is desired. The act of resuming supply of fuel to the cylinder may include supplying a sufficient amount of fuel to consume the predetermined amount of intake air forced into the three-way catalyst.

The vehicle may include a controller. Consequently, the acts of determining whether a deceleration of the vehicle is desired, ceasing supply of fuel, operating the device to close the first intake valve at the first predetermined instance and close the second intake valve at the second predetermined instance, and resuming supply of fuel may be accomplished via the controller.

The act of closing the second intake valve at the second predetermined instance may increase an amount of energy recovered by the motor-generator to recharge the energy-storage system during vehicle deceleration as compared to an amount of energy that would be recovered if the second intake valve was closed at the first predetermined instance.

The device may be a concentric camshaft mechanism having a first camshaft lobe configured to regulate operation of the first intake valve and a second camshaft lobe configured to regulate operation of the second intake valve. In such a case, the concentric camshaft mechanism is configured to alter position of the first lobe with respect to position of the second lobe.

A system for controlling the above hybrid electric vehicle and a vehicle employing such a system are also provided. The system and the vehicle each include a controller that is configured to execute the aforementioned method.

The vehicle may include a brake pedal such that the controller may be additionally configured to monitor a position of the brake pedal to determine whether deceleration of the vehicle is desired. Additionally, the controller may be configured to operate the device to close the second intake valve at the first predetermined instance when the brake pedal is released.

The above features and advantages and other features and advantages of the present invention are readily apparent from the following detailed description of the best modes for carrying out the invention when taken in connection with the accompanying drawings.

DETAILED DESCRIPTION

Figure 1:
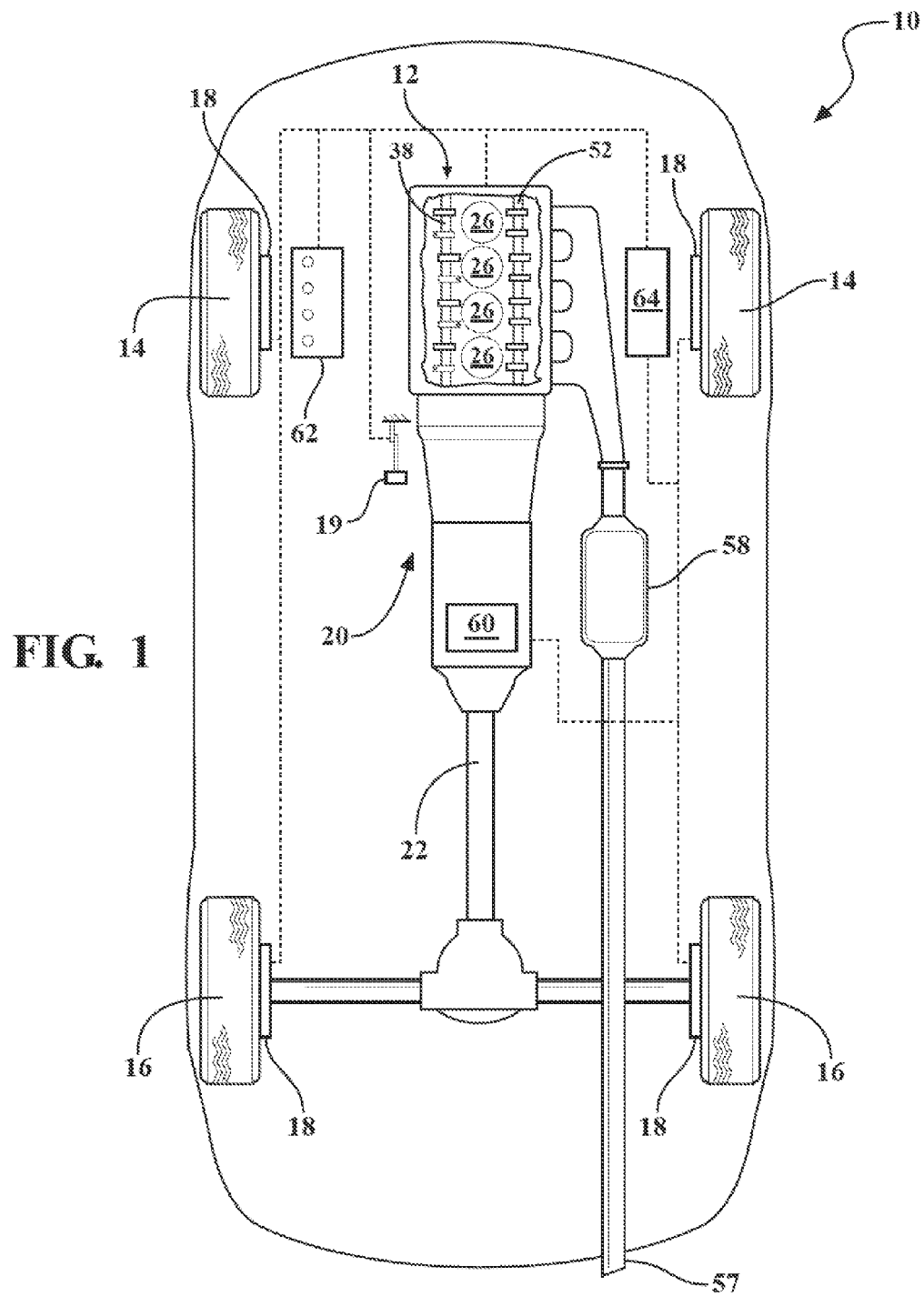
FIG. 1 is a schematic illustration of a hybrid electric vehicle including an internal combustion engine having a device configured to regulate operation of the engine's intake valves.

Referring to the drawings, wherein like reference numbers refer to like components, FIG. 1 shows a schematic view of a hybrid electric vehicle (HEV) 10. The HEV 10 incorporates a powertrain that includes an internal combustion engine 12, such as a spark or a compression ignition type, adapted for driving wheels 14 and/or wheels 16 to propel the vehicle. Engine 12 may also be employed for engine braking, i.e., using the inertia of the HEV 10 to rotate the engine, thereby slowing the vehicle when the HEV is coasting down from elevated speed.

The hybrid vehicle 10 may also be slowed or retarded by a friction braking system that includes braking members 18. Braking members 18 are actuated by an operator of HEV 10 via a brake pedal 19 when vehicle deceleration is desired, such as during stop and go operation in city traffic or when the HEV otherwise gains speed while coasting downhill. Braking members 18 typically include components such as brake rotors, brake calipers and brake pads that are commonly hydraulically actuated, as known to those skilled in the art, and are not explicitly shown. Braking members 18 are configured to apply a frictional force to the wheels 14 and 16 for reducing speed of the HEV by dissipating the vehicle's kinetic energy as heat.

Figure 2:
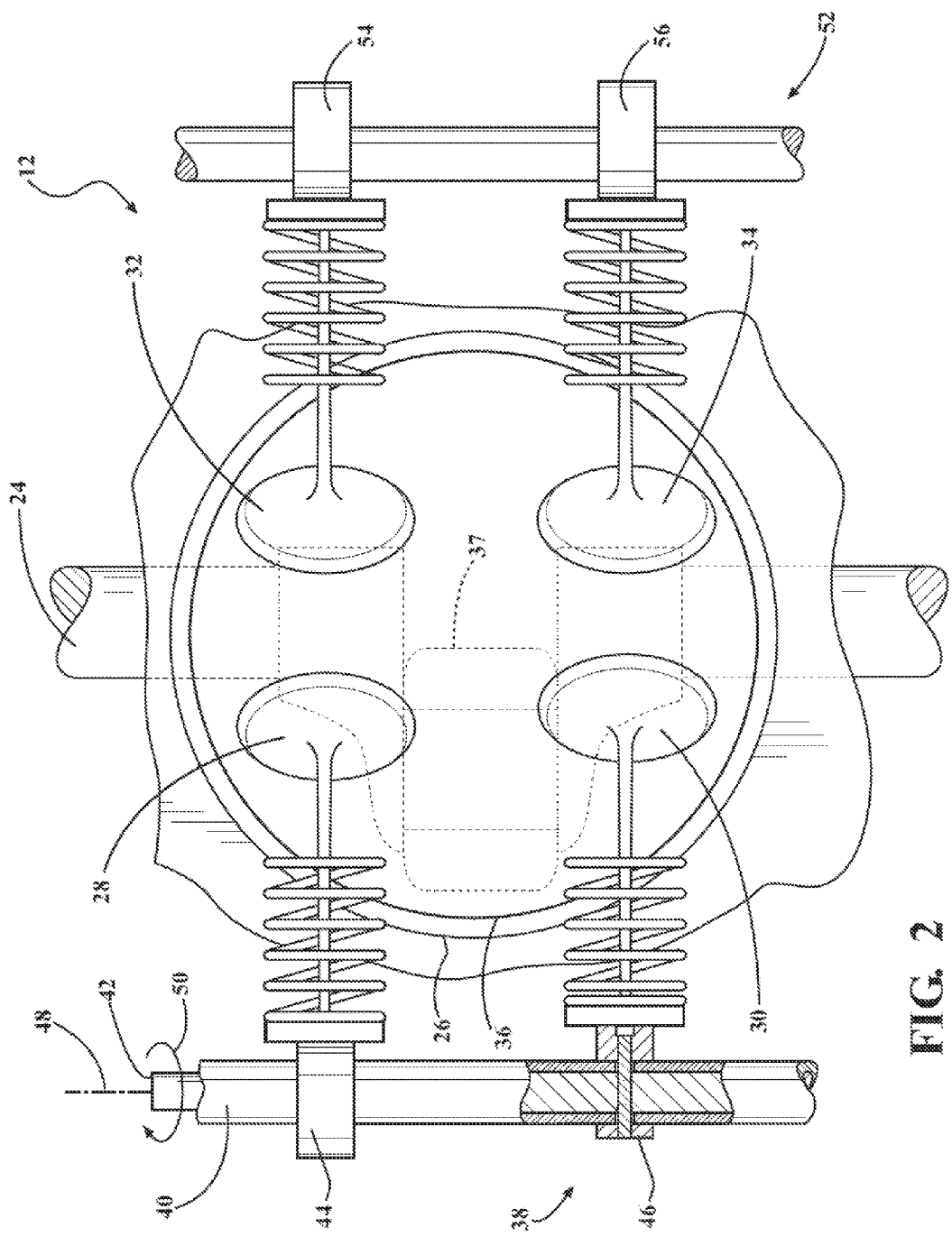
FIG. 2 is an illustration of a specific embodiment of the device schematically depicted in FIG. 1.

The engine 12 applies its torque to the driven wheels 14 and/or 16 through a transmission 20 and via a drive or a propeller shaft 22. As shown in FIG. 2, the engine 12 includes a crankshaft 24 and cylinders 26. Each cylinder 26 is provided with a first intake valve 28, a second intake valve 30, a first exhaust valve 32, and a second exhaust valve 34. Each intake valve 28, 30 is configured to control a supply of air or of air and fuel into the respective cylinder 26 when the engine 12 is propelling the HEV 10. Each exhaust valve 32, 34 is configured to control the removal of post combustion exhaust gas from the respective cylinder 26. As also shown in FIG. 2, each cylinder 26 also includes a piston 36 and a connecting rod 37. As additionally shown in FIG. 2, each piston 36 is configured to reciprocate under the force of combustion inside the respective cylinder 26, and thereby rotate the crankshaft 24 via the connecting rod 37. As will be appreciated by those skilled in the art, exhaust emissions, fuel efficiency, and power output of the engine 12 may each be affected by the timing of opening and closure of intake valves 28, 30 and exhaust valves 32, 34 relative to top and bottom dead center positions of the respective piston 36.

The engine 12 is configured to be shut off and motored by vehicle inertia during deceleration of the HEV 10 for improved fuel efficiency of the HEV, and then automatically restarted when acceleration of the HEV is again desired. To shut off the engine 12, a supply of fuel is ceased to be delivered to each cylinder 26, and is then resumed when the engine is to be restarted. Typically, when the fuel supply to an internal combustion engine is shut off and the engine is motored the internal rotating components, such as the crankshaft, valves, and pistons, of the subject engine remain in motion. Consequently, the cylinders of the motored engine continue to generate vacuum, and then draw in, compress, and pump out air. Accordingly, although the subject engine does not burn fuel or generate combustion forces, the engine does continue to experience spin and pumping losses. Such spin and pumping losses typically translate into reduced operating efficiency of the subject vehicle and counteract the improvement in fuel economy otherwise seen from shutting off the engine's fuel supply during deceleration.

To reduce spin and pumping losses in the engine 12 when the engine is being motored and to facilitate improved fuel efficiency when the engine is restarted, the engine additionally includes a device 38 that is operatively connected to the cylinders 26. The device 38 is configured to close the first intake valves 28 at a first predetermined instance and close the second intake valves 30 at a second predetermined instance when a supply of fuel to the cylinders 26 has been ceased during deceleration of the HEV 10. During operation of the engine 12, the second predetermined instance occurs after the first predetermined instance relative to rotational position of the crankshaft 24. The first predetermined instance is typically established during testing and development of the engine 12 with the intent of maximizing engine efficiency during fueled operation. Accordingly, both the first and second sets of intake valves 28, 30 may be regulated to close at the first predetermined instance when the engine 12 is fueled. The second predetermined instance may also be established during testing and development of the engine 12, but with the intent of reducing the amount of intake air being trapped inside the cylinders 26 when the engine is being motored and the fuel supply is cut off.

As shown in the embodiment of FIG. 2, the device 38 is configured as a concentric camshaft mechanism having an outer shaft 40 and an inner shaft 42. A set of first camshaft lobes 44 is fixed to the outer shaft 40 and a set of second camshaft lobes 46 is fixed to the inner shaft 42. Alternatively, the first camshaft lobes 44 may be fixed to the inner shaft 42, while the set of second camshaft lobes 46 may be fixed to the outer shaft 40. The first camshaft lobes 44 are configured to regulate operation of the respective first intake valves 28 and the second camshaft lobes 46 are configured to regulate operation of the respective second intake valves 30. The device 38 may be driven by the crankshaft 24 via a chain or a belt (not shown), such that the rotation of the concentric camshaft mechanism is tied to the rotation of the crankshaft and to the position of the pistons 36 in the engine 12.

With continued reference to FIG. 2, the inner shaft 42 is configured to rotate relative to the outer shaft 40 about an axis 48, as depicted by an arrow 50, and to thereby alter position of the first camshaft lobes 44 with respect to position of the second camshaft lobes 46. When the position of the first camshaft lobes 44 is thus altered with respect to position of the second camshaft lobes 46, the first intake valves 28 are closed at the first predetermined instance, and the second intake valves 30 are closed at the second predetermined instance. Hence, with respect to the rotational position of the crankshaft 24, the first intake valves 28 may be closed earlier than the second intake valves 30 when a supply of fuel to the cylinders 26 has been ceased during deceleration of the HEV 10. As shown in FIG. 2, the engine 12 also includes an exhaust camshaft 52. The exhaust camshaft 52 includes a set of third camshaft lobes 54 that is configured to regulate operation of the first exhaust valves 32 and a set of fourth camshaft lobes 56 configured to regulate operation of the second exhaust valves 34.

With renewed reference to FIG. 1, during fueled operation, the engine 12 emits gases that are a product of the combustion process through the first and second exhaust valves 32, 34, into an exhaust system 57, and out to the atmosphere. The exhaust system 57 includes a three-way catalytic converter 58 that is employed to reduce toxicity of the emitted exhaust gases, i.e., exhaust emissions, prior to the gases entering the atmosphere. The three-way catalytic converter 58 has three simultaneous tasks: 1) reduction of nitrogen oxides or $NO_x$ to nitrogen and oxygen, 2) oxidation of carbon monoxide to carbon dioxide, and 3) oxidation of unburned hydrocarbons to carbon dioxide and water.

When the air-fuel mixture entering the cylinders is within a narrow fuel/air ratio band surrounding stoichiometry, conversion of all three pollutants within the three-way catalytic converter 58 is nearly complete. However, outside that band conversion efficiency of the three-way catalytic converter 58 falls off rapidly. When there is more oxygen in the air-fuel mixture, and subsequently in the exhaust gases, than required, incomplete reduction of $NO_x$ may result. When the supply of fuel is ceased under deceleration of the HEV 10, the engine 12 is operated as an air pump, which leads to the three-way catalytic converter 58 being saturated with oxygen. Upon restart of the engine 12, a proportionate amount of fuel needs to be supplied into the exhaust system 57 to compensate for and consume the amount of air that has been forced into the three-way catalytic converter 58.

By closing the second intake valves 30 at the second predetermined instance a predetermined reduced amount of intake air is forced into the three-way catalyst 58 under un-fueled deceleration of HEV 10. The predetermined reduced amount of intake air that is thus forced into the three-way catalyst 58 is smaller than the amount of air that would be forced into the catalyst if the second intake valves 30 were closed at the first predetermined instance. Accordingly, by reducing the amount of oxygen that is forced into the three-way catalytic converter 58, the device 38 permits a proportionately smaller amount of fuel to be to be supplied to the cylinders 26 upon restart of the engine 12, thus facilitating improved fuel efficiency of the engine.

As shown in FIG. 1, the powertrain of HEV 10 additionally incorporates a motor-generator 60. As shown, the motor-generator 60 is positioned within the transmission 20, but may also be positioned anywhere in the HEV 10, depending on the vehicle architecture and control of the power flow. The HEV 10 is capable of being propelled by the motor-generator 60 alone, or in combination with the engine 12. The motor-generator 60 is configured to receive energy from and supply energy to an energy-storage system 62, such as one or more rechargeable battery modules. The energy-storage system 62 supplies electrical energy for cranking and starting the engine 12, the motor-generator 60, and miscellaneous vehicle accessories, e.g., vehicle heating and ventilation system, and exterior and interior lighting. The energy-storage system 62 is configured to selectively store energy up to a maximum allowable state of charge (SOC), and release the stored energy down to a specified minimum SOC.

In addition to the frictional braking via the braking members 18, for deceleration the HEV 10 may employ the regenerative braking mentioned above. Regenerative braking is a mechanism that is typically included in hybrid vehicles to decelerate the vehicle by converting some of the vehicle's kinetic energy into a storable form of energy instead of dissipating it as heat. In regenerative braking, the inertia of the HEV 10 is used to drive the motor-generator 60 thus causing the driven motor-generator to generate electrical current. Meanwhile, such driving of the motor-generator additionally generates negative output torque from the transmission 20 which acts to slow the vehicle when the HEV 10 is coasting down from elevated speed. Regenerative braking typically provides a lower rate of deceleration of a subject vehicle than does the more common frictional braking accomplished via the braking members 18. It may therefore be desirable to retain engine braking while the engine 12 is shut off during regenerative braking to aid with the deceleration of the HEV 10.

The storable energy from regenerative braking is typically channeled to the energy-storage system 62 via the motor-generator 60 to restore its depleted SOC. Because regenerative braking recaptures otherwise lost energy, it may provide a more efficient mode of vehicle retardation than braking via the members 18 of the friction braking system. Because the engine 12 is not needed to power HEV 10 during regenerative braking, fuel delivery to the engine 12 may be cut off, thus additionally improving vehicle efficiency. By closing the second intake valves 30 at the second predetermined instance, the pumping losses of the engine 12 are reduced as compared to the pumping losses if the second intake valves were closed at the first predetermined instance. Such reduced pumping losses decrease the amount of inertial energy absorbed by spinning the engine 12 during deceleration of the HEV 10. Accordingly, the operation of the device 38 permits vehicle inertia to drive the motor-generator 60 more effectively to increase the amount of energy recovered by the motor-generator 60 for recharging the energy-storage system 62 during vehicle deceleration.

With continued reference to FIG. 1, the HEV 10 also includes a controller 64 configured to regulate the operation of the engine 12, the motor-generator 60, the transmission 20, and the members 18 of the friction braking system. The controller 64 is also configured to monitor the SOC of the energy-storage system 62. The controller 64 is additionally configured to determine whether a deceleration of the HEV 10 is desired and cease supply of fuel to cylinders 26 when such a condition is satisfied. Furthermore, the controller 64 is configured to operate the device 38 to close first intake valves 28 at the first predetermined instance and close second intake valves 30 at the second predetermined instance when the fuel supply to the cylinders 26 is cut off. Accordingly, the controller 64 is configured to reduce the magnitude of compression pulses in the cylinders 26 and increase manifold absolute pressure when fuel supply is ceased during deceleration as compared to when the cylinders are being fueled.

The controller 64 may also be configured to determine whether a deceleration of HEV 10 is desired by the vehicle's operator via monitoring a position of the brake pedal 19. When it is determined that the deceleration of HEV 10 is desired, supply of fuel to engine 12 is regulated and ceased by the controller 64. When deceleration of HEV 10 is no longer desired, such as when the brake pedal 19 is released, the controller 64 may regulate the device 38 back to the fuel-on position where both the first and second sets of intake valves 28, 30 are regulated to close at the first predetermined instance. Furthermore, following regulating the device 38 back to the fuel-on position, the controller 64 may additionally resume supply of fuel to the engine 12. Thus resumed by the controller 64, the supply of fuel delivered to the cylinder 26 would be sufficient to consume the amount of intake air actually forced into the three-way catalyst 58 during deceleration of the HEV 10.

Figure 3:
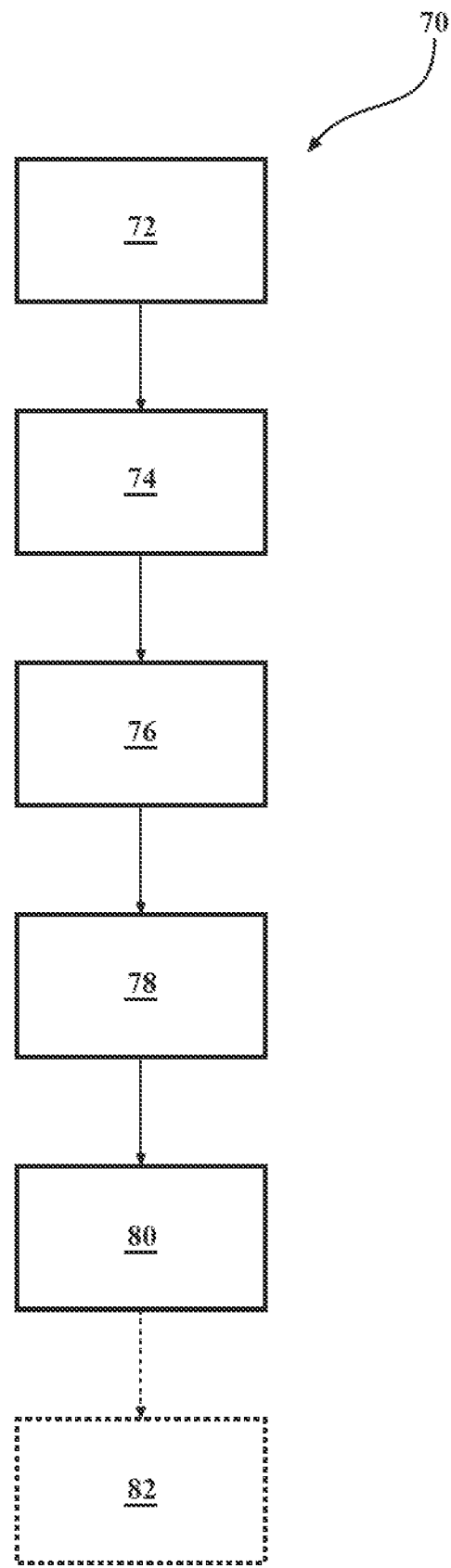
FIG. 3 is a flow diagram of a method of controlling the hybrid electric vehicle of FIG. 1.

FIG. 3 depicts a method 70 for controlling the HEV 10 described above with respect to FIGS. 1 and 2. The method commences in frame 72 with the HEV 10 progressing down the road at a measurable velocity. The method then proceeds from frame 72 to frame 74 for determining by the controller 64 whether deceleration of the HEV 10 is desired. Following frame 74, in frame 76 the method includes ceasing by the controller 64 a supply of fuel to engine 12 when such deceleration is desired. Following the ceasing of the fuel supply to the engine 12 in frame 76, the method proceeds to frame 78. In frame 78, the method includes closing the first intake valves 28 at the first predetermined instance via the device 38 when the supply of fuel to the cylinders 26 has been ceased.

From frame 78, the method proceeds to frame 80. In frame 80, the method includes closing the second intake valves 30 via the device 38 at the second predetermined instance when the supply of fuel to the cylinder has been ceased. As described above with respect to FIGS. 1 and 2, such closing of the second intake valves 30 via the device 38 at the second predetermined instance serves to reduce the magnitude of compression pulses in the cylinders 26 during un-fueled deceleration relative to when the cylinders are being fueled.

By closing the second intake valves 30 at the second predetermined instance the pumping losses of the engine 12 are reduced as compared to the losses that would be incurred if the second intake valves 30 were closed at the first predetermined instance. Additionally, the operation of the device 38 permits vehicle inertia to drive the motor-generator 60 more effectively to increase the amount of energy recovered by the motor-generator 60 for recharging the energy-storage system 62 during vehicle deceleration. Furthermore, closing of the second intake valves 30 at the second predetermined instance reduces the amount of oxygen that is forced into the three-way catalytic converter 58. Such a reduction of the amount of oxygen pumped into the three-way catalytic converter 58 permits a proportionately smaller amount of fuel to be to be supplied to the cylinders 26 upon restart of the engine 12 and facilitates improved fuel efficiency of the engine.

According to the method, the controller 64 may also monitor position of the brake pedal 19 as an indicator of whether or not the vehicle operator desires to reduce speed of HEV 10. Furthermore, the controller 64 may regulate the device 38 to the predetermined fuel-on position when the brake pedal 19 is released. Additionally, the supply of fuel to engine 12 may be resumed via the controller 64 in frame 82 when the brake pedal 19 has been released thus indicating that deceleration of the vehicle is no longer desired. Method 70 may also be applied during regenerative braking of HEV 10, when the motor-generator 60 is driven in generator mode to recharge the energy-storage system 62.

While the best modes for carrying out the invention have been described in detail, those familiar with the art to which this invention relates will recognize various alternative designs and embodiments for practicing the invention within the scope of the appended claims.

The invention claimed is:

1. A method of controlling a hybrid electric vehicle having an internal combustion engine including a crankshaft, a cylinder provided with a first intake valve, a second intake valve, and a piston configured to reciprocate inside the cylinder and rotate the crankshaft, the method comprising:
closing the first and second intake valves via a device operatively connected to the cylinder at a first predetermined instance when the cylinder is being fueled;
wherein the device is a concentric camshaft mechanism having a first camshaft lobe configured to regulate operation of the first intake valve and a second camshaft lobe configured to regulate operation of the second intake valve, and wherein the concentric camshaft mechanism is configured to alter position of the first lobe with respect to position of the second lobe;
determining whether a deceleration of the vehicle is desired;
ceasing a supply of fuel to the cylinder to motor the engine when the deceleration is desired;
closing the first intake valve via the device at the first predetermined instance when the supply of fuel to the cylinder has been ceased; and
closing the second intake valve via the device at a second predetermined instance when the supply of fuel to the cylinder has been ceased;
wherein:
the second predetermined instance is after the first predetermined instance relative to rotational position of the crankshaft; and
closing the second intake valve at the second predetermined instance reduces an amount of intake air being trapped inside the cylinder when the supply of fuel has been ceased and reduces a magnitude of compression pulses in the cylinder during deceleration relative to when the cylinder is being fueled.

2. The method of claim 1, wherein the engine additionally includes an exhaust valve in fluid communication with an exhaust system that includes a three-way catalyst, and wherein:
said closing the second intake valve at the second predetermined instance forces a predetermined amount of intake air into the three-way catalyst via the exhaust system;
the predetermined amount of intake air forced into the three-way catalyst is reduced as compared to an amount of intake air that would be forced into the three-way catalyst if the second intake valve was closed at the first predetermined instance; and
said closing the second intake valve at the second predetermined instance reduces an amount of fuel required by the cylinder to restart the engine when acceleration of the vehicle is desired.

3. The method of claim 2, further comprising supplying the amount of fuel to the cylinder to restart the engine when acceleration of the vehicle is desired.

4. The method of claim 3, wherein the amount of fuel supplied to the cylinder is sufficient to consume the predetermined amount of intake air forced into the three-way catalyst.

5. The method of claim 3, wherein the vehicle includes a controller, and wherein each of said determining whether a deceleration of the vehicle is desired, ceasing the supply of fuel, operating the device to close the first intake valve at the first predetermined instance and close the second intake valve at the second predetermined instance, and supplying the amount of fuel is accomplished via the controller.

6. The method of claim 1, the vehicle additionally having a motor-generator and an energy-storage system operatively connected to the engine and to the motor-generator, wherein said closing the second intake valve at the second predetermined instance increases an amount of energy recovered by the motor-generator to recharge the energy-storage system during vehicle deceleration as compared to an amount of energy that would be recovered if the second intake valve was closed at the first predetermined instance.

7. A system for controlling a hybrid electric vehicle, the system comprising:
a first intake valve, a second intake valve, and an exhaust valve, wherein each intake valve is configured to control a supply of air into a cylinder of an internal combustion engine of the vehicle;
a device operatively connected to the cylinder and configured to close the first intake valve at a first predetermined instance and close the second intake valve at a second predetermined instance when a supply of fuel to the cylinder has been ceased to thereby reduce an amount of intake air being trapped inside the cylinder and reduce a magnitude of compression pulses in the cylinder during deceleration relative to when the cylinder is being fueled, and configured to close the first and second intake valves at the first predetermined instance when the cylinder is being fueled, wherein the second predetermined instance is after the first predetermined instance relative to rotational position of a crankshaft of the engine;
wherein the device is a concentric camshaft mechanism having a first camshaft lobe configured to regulate operation of the first intake valve and a second camshaft lobe configured to regulate operation of the second intake valve, and wherein the concentric camshaft mechanism is configured to alter position of the first lobe with respect to position of the second lobe; and a controller configured to:
  determine whether a deceleration of the vehicle is desired;
  cease supply of fuel to the cylinder to motor the engine when the deceleration is desired; and
  operate the device to close the first intake valve at the first predetermined instance and close the second intake valve at the second predetermined instance.

8. The system of claim 7, wherein the engine additionally includes an exhaust valve in fluid communication with an exhaust system that includes a three-way catalyst, and wherein:
  a predetermined amount of intake air is forced into the three-way catalyst via the exhaust system when the second intake valve is closed at the second predetermined instance;
  the predetermined amount of intake air forced into the three-way catalyst is reduced as compared to an amount of intake air that would be forced into the three-way catalyst if the second intake valve was closed at the first predetermined instance; and
  an amount of fuel required by the cylinder to restart the engine when acceleration of the vehicle is desired is reduced by closing the second intake valve at the second predetermined instance.

9. The system of claim 8, the controller is additionally configured to supply the amount of fuel to the cylinder to restart the engine when acceleration of the vehicle is desired.

10. The system of claim 9, wherein the amount of fuel supplied to the cylinder is sufficient to consume the predetermined amount of intake air forced into the three-way catalyst.

11. The system of claim 7, wherein the vehicle additionally includes a motor-generator and an energy-storage system operatively connected to the engine and to the motor-generator, and wherein the second intake valve being closed at the second predetermined instance increases the amount of energy recovered by the motor-generator to recharge the energy-storage system during vehicle deceleration as compared to an amount of energy that would be recovered if the second intake valve was closed at the first predetermined instance.

12. A hybrid electric vehicle comprising:
  an internal combustion engine configured to power the vehicle, the engine including:
    a crankshaft;
    a cylinder provided with a first intake valve, a second intake valve,
    and an exhaust valve, wherein each intake valve is configured to control a supply of air into the cylinder and the exhaust valve is configured to control the removal of exhaust gas from the cylinder; and
    a piston configured to reciprocate inside the cylinder and rotate the crankshaft; and
    a device operatively connected to the cylinder and configured to close the first intake valve at a first predetermined instance and close the second intake valve at a second predetermined instance when a supply of fuel to the cylinder has been ceased to thereby reduce an amount of intake air being trapped inside the cylinder and reduce a magnitude of compression pulses in the cylinder during deceleration relative to when the cylinder is being fueled, and configured to close the first and second intake valves at the first predetermined instance when the cylinder is being fueled, wherein the second predetermined instance is after the first predetermined instance relative to rotational position of the crankshaft;
    wherein the device is a concentric camshaft mechanism having a first camshaft lobe configured to regulate operation of the first intake valve and a second camshaft lobe configured to regulate operation of the second intake valve, and wherein the concentric camshaft mechanism is configured to alter position of the first lobe with respect to position of the second lobe; and
  a controller configured to:
    determine whether a deceleration of the vehicle is desired;
    cease the supply of fuel to the cylinder to motor the engine when the deceleration is desired; and
    operate the device to close the first intake valve at the first predetermined instance and close the second intake valve at the second predetermined instance.

13. The vehicle of claim 12, wherein:
  the exhaust valve is in fluid communication with an exhaust system that includes a three-way catalyst;
  a predetermined amount of intake air is forced into the three-way catalyst via the exhaust system when the second intake valve is closed at the second predetermined instance;
  the predetermined amount of intake air forced into the three-way catalyst is reduced as compared to an amount of intake air that would be forced into the three-way catalyst if the second intake valve was closed at the first predetermined instance; and
  an amount of fuel required by the cylinder to restart the engine when acceleration of the vehicle is desired is reduced by closing the second intake valve at the second predetermined instance.

14. The vehicle of claim 13, the controller is additionally configured to supply the amount of fuel to the cylinder to restart the engine when acceleration of the vehicle is desired.

15. The vehicle of claim 14, wherein the amount of fuel supplied to the cylinder is sufficient to consume the predetermined amount of intake air forced into the three-way catalyst.

16. The vehicle of claim 12, further comprising a motor-generator configured to power the vehicle and an energy-storage system operatively connected to the engine and to the motor-generator, wherein the second intake valve being closed at the second predetermined instance increases an amount of energy recovered by the motor-generator to recharge the energy-storage system during vehicle deceleration as compared to an amount of energy that would be recovered if the second intake valve was closed at the first predetermined instance.

17. The vehicle of claim 12, further comprising a brake pedal, and wherein the controller is additionally configured to monitor a position of the brake pedal to determine whether the deceleration of the vehicle is desired and to operate the device to close the second intake valve at the first predetermined instance when the brake pedal is released.

* * * * *